US006751642B1

(12) United States Patent
Cambonie et al.

(10) Patent No.: US 6,751,642 B1
(45) Date of Patent: Jun. 15, 2004

(54) PROCESS AND DEVICE FOR TRANSFORMING COMPLEX SYMBOLS INTO REAL DATA, ESPECIALLY FOR THE TRANSMISSION OVER A TELEPHONE LINE OF PHASE-MODULATED AND AMPLITUDE-MODULATED CARRIERS

(75) Inventors: Joël Cambonie, La Combe de Lancey (FR); Philippe Mejean, Grenoble (FR); Dominique Barthel, Bernin (FR); Joël Lienard, Meylan (FR); Simone Mazzoni, Grenoble (FR)

(73) Assignees: STMicroelectronics S.A., Gentilly (FR); France Telecom, Paris (FR)

( * ) Notice: Subject to any disclaimer, the term of this patent is extended or adjusted under 35 U.S.C. 154(b) by 635 days.

(21) Appl. No.: 09/585,749

(22) Filed: Jun. 2, 2000

(30) Foreign Application Priority Data

Jun. 2, 1999 (FR) ............................................ 99 06963

(51) Int. Cl.[7] .............................................. G06F 15/00
(52) U.S. Cl. ...................................................... 708/404
(58) Field of Search ................................ 708/400, 401, 708/403, 404, 405, 406, 408, 409

(56) References Cited

U.S. PATENT DOCUMENTS 5,890,098 A * 3/1999 Kozaki et al. ................. 702/77
6,023,719 A * 2/2000 Barak et al. .................. 708/405

FOREIGN PATENT DOCUMENTS

EP          0855657        7/1998

OTHER PUBLICATIONS

Shousheng, et al. "Designing Pipeline FFT Processor for OFDM (de) Modulation" URSI International Symposium on Signals, Systems, and Electronics. 1998, pp. 257–262.
Bidet, et al. "A Fast Single–Chip Implementation of 8192 Complex Point FFT" IEEE Journal of Solid–State Circuits. vol. 30, No. 3, Mar. 1995.
Bi, G. et al. "A Pipelined FFT Processor for Word–Sequential Data" IEEE Transactions on Acoustics, Speech, and Signal Processing. vol. 37, No. 12, Dec. 1989, pp. 1982–1985.
Agarwal, et al. "Vectorized Mixed Radix Discrete Fourier Transform Algorithms" Proceedings of the IEEE, vol. 75, vol. 75, No. 9Sep. 1987, pp. 1283–1292.

* cited by examiner

Primary Examiner—Chuong Dinh Ngo
(74) Attorney, Agent, or Firm—Lisa K. Jorgenson; Allen, Dyer, Doppelt, Milbrath & Gilchrist, P.A.

(57) ABSTRACT

Interleaved type processing includes a preprocessing phase in which for each initial symbol received an auxiliary symbol that includes N auxiliary complex samples is formulated, and a processing phase that includes for each auxiliary symbol an inverse Fourier transform calculation of size N. The processing phase includes elementary processing of the butterfly type corresponding to several stages of a general butterfly-like calculation graph. The various stages of the graph are implemented within a pipelined architecture. Upon receiving an initial symbol, two separate random access memories are simultaneously used to respectively store in a first memory the auxiliary symbol corresponding to this initial symbol, and to perform on the basis of the content of the second memory the elementary processing corresponding to a first stage of the graph. The two memories are swapped with each new receipt of an initial symbol. The interleaved type processing delivers the 2N real output data corresponding to the initial symbol received.

22 Claims, 5 Drawing Sheets

PROCESS AND DEVICE FOR TRANSFORMING COMPLEX SYMBOLS INTO REAL DATA, ESPECIALLY FOR THE TRANSMISSION OVER A TELEPHONE LINE OF PHASE-MODULATED AND AMPLITUDE-MODULATED CARRIERS

FIELD OF THE INVENTION

The invention relates to the field of modulation/demodulation of information signals, and, more particularly, to transforming a stream of complex symbols initially formed of N complex samples into a stream of respective groups of 2N real output data using interleaved type processing. The invention applies to systems for transmitting orthogonal frequency division multiplex (OFDM) coded information. These systems form, for example, the sending portion of a very high speed digital modulation/demodulation device (VDSL modem).

BACKGROUND OF THE INVENTION

In OFDM coding, the signal to be transmitted is coded on N carriers which are phase-modulated and amplitude-modulated as a function of the content of the information to be transmitted. Each carrier has a predetermined frequency and all the frequencies of the carriers are a submultiple of a predetermined sampling frequency. Also each symbol formed of N digital carriers, which are N complex samples sampled at the sampling frequency, must be transformed into a group of 2N real data sampled at twice the sampling frequency. This allows transmission over a transmission channel, such as a telephone line.

The transformation of an initial complex symbol respectively formed of N initial complex samples into a group of 2N real output data can be performed in several ways. A first approach performs an inverse Fourier transform of twice the size, that is, of size 2N. However, this approach requires the addition of an extra processing stage as well as the addition of extra memory.

A second approach performs an inverse Fourier transform of the same size, that is, of size N. This is followed by a complex filtering to eliminate part of the spectrum. However, such an implementation leads to a relatively complicated hardware embodiment.

A third approach also performs an inverse Fourier transform of size N, but this is followed by real filtering. However, this approach, which is simpler to implement than the previous approach, is approximate with regards to the accuracy obtained by the signal-to-noise ratio. The signal-to-noise ratio may turn out to be relatively large, thus leading to signal degradations. Also, the increase in the performance of this approach, that is, the reduction in the signal-to-noise ratio, requires the use of an extremely large real filter. This involves an expensive hardware implementation.

Another approach performs the transformation of the stream of initial complex signals respectively formed of N initial complex samples into a stream of respective groups of 2N real output data. This is done by interleaved type processing whose theoretical formulation is well known to one skilled in the art.

The main characteristics of interleaved type precessing will be discussed for all useful purposes. The real signal x(t) corresponding, for example, to an OFDM symbol, is defined by formula (I):

$$x(t) = \sum_{k=1}^{N-1} M_k \cdot \cos(2\pi f_k t + \varphi_k) \qquad \text{(I)}$$

The symbol $M_k$ denotes the amplitude of the carrier of rank k, $\phi_k$ denotes its phase, $f_k$ denotes its frequency and N−1 the number of carriers. When the frequencies of the carriers are all multiples of a frequency $f_1$, then formula (I) becomes formula (II) in complex notation:

$$x(t) = \text{Re}\left[\sum_{k=1}^{N-1} C_k \cdot e^{2j\pi k f_1 t}\right]. \qquad \text{(II)}$$

The symbol $C_k$ denotes the initial complex sample representative of the carrier of rank k. $C_k$ is defined by the formula (III):

$$C_k = M_k e^{j\phi_k} \qquad \text{(III)}$$

With a sampling of the signal at the frequency $Nf_1$ and by extending the length of the symbol to N carriers (by adding the carrier C taken equal to 0), it can then be shown that the N real output data of even ranks, corresponding to the N complex samples of the input symbol are given by formula (IV):

$$\{x_{2p}\} = \text{Re}\left(IFFT_N\left\{(C_k + \overline{C}_{N-k}) + j(C_k - \overline{C}_{N-k})e^{\frac{j\pi}{N}k}\right\}\right) \qquad \text{(IV)}$$

The real data of odd ranks $x_{2p+1}$ are given by formula (V):

$$\{x_{2p}+1\} = \text{Im}\left(IFFT_N\left\{(C_k + \overline{C}_{N-k}) + j(C_k - \overline{C}_{N-k})e^{\frac{j\pi}{N}k}\right\}\right) \qquad \text{(V)}$$

In these formulas (IV) and (V), $\overline{C}_{N-k}$ represents the complex conjugate of the complex number $C_{N-k}$, $IFFT_N$ represents the inverse Fourier transform of size N operator, Im denotes the imaginary part of a complex number, and Re denotes the real part of a complex number.

The processing of the interleaved type includes a preprocessing phase in which, for each initial symbol received formed of N initial complex samples $C_k$, an auxiliary symbol formed of N auxiliary complex samples $A_k$ is formulated. Each auxiliary complex sample $A_k$ is defined by formula (VI):

$$A_k = (C_k + \overline{C}_{N-k}) + j(C_k - \overline{C}_{N-k})e^{j\pi k/N} \qquad \text{(VI)}$$

After this preprocessing, a processing phase is performed which includes, for each auxiliary symbol formed of the auxiliary samples $A_k$, an inverse Fourier transform calculation of size N. The result of this inverse Fourier transform is a set of N complex output coefficients $X_k$ which, after rearrangement so as to retrieve the input order, makes it easily possible to obtain the 2N real data corresponding to the input symbol. This is so since the real data of even and odd ranks correspond respectively to the real parts and imaginary parts of the complex output samples successively obtained after rearrangement.

At present, the only known implementation of this interleaved processing is an entirely software implementation which turns out to be relatively complex to use in industrial devices, such as modems, for example. Furthermore, the larger the size of the Fourier transform and the greater the increase in processing speed, the more severe the implementation constraints become.

Moreover, numerous implementations of direct or inverse Fourier transforms which are dedicated or programmed on microprocessors for signal processing have been set out in the literature. Most of these implementations use a variation of the Cooley-Tukey algorithm, which makes it possible to reduce the number of arithmetic operations required to calculate the Fourier transform.

The Cooley-Tukey algorithm will be readily understood by one skilled in the art. This algorithm makes it possible, in particular, to reduce the calculation of a fast Fourier transform of initial size $r^p$, where r represents the "radix" according to the terminology customarily used by one skilled in the art, into that of r Fourier transforms of size $r^{p-1}$ and of additional complex additions and multiplications. By iteratively repeating this reduction, we arrive at the calculation of Fourier transforms of size r, which are easily achievable, especially if r is chosen equal to 2 or 4.

The Cooley-Tukey algorithm uses a calculation graph exhibiting a general butterfly-like structure, well known to one skilled in the art, and is commonly referred to by the term "butterfly". Several hardware architectures are then possible to implement a butterfly-like calculation structure.

A first approach constructs a hardware operator capable of performing a butterfly type calculation, i.e., per butterfly of the graph. However, this approach is only conceivable with respect to the implementation of Fourier transforms of small size.

A second approach constructs just a single hardware operator of the butterfly type, and is intended for performing in succession the calculations corresponding to all the butterflies of all the stages of the graph. This approach requires a very fast hardware operator, and an input memory which is separate from the memory serving to write the intermediate calculation results. This is done to avoid access conflicts when a data block enters the operator while the previous block is still undergoing processing.

An intermediate approach constructs a hardware operator of the butterfly type per stage of the graph, as well as a storage element. Storage elements include delay lines or shift registers, whose function is to input the data into the operator in the correct order with regards to the butterflies of the graph of the relevant stage. Such architectures are said to be serial or pipelined.

More precisely, an electronic device for calculating a Fourier transform of the so-called pipelined architecture includes a plurality of successive processing stages connected in series between the input and the output of the device by internal data paths. These stages respectively include elementary processing means able to perform processing of Fourier transforms of elementary sizes, which are smaller than the initial size, on data blocks of sizes which are successively reduced from one stage to the next. These stages also include elementary storage elements.

The expression "initial size" of the Fourier transform is understood to mean here and in the subsequent text the size of the blocks received at the input of the device by the first stage. The elementary sizes of the Fourier transforms performed by the various stages can be identical and equal to the radix of the Fourier transform. We then speak of a uniform radix Fourier transform. They may differ from one stage to another in the case of mixed radix Fourier transforms.

Examples of such pipelined architectures are described in the article by Bi and Jones entitled "A Pipelined FFT Processor for Word-Sequential Data", IEEE Transactions on Acoustic Speech and Signal Processing, Vol. 37, No. 12, December 1989, pages 1982–1985, and in the article by Bidet et al., entitled "A Fast Single-Chip Implementation of 8192 Complex Point FFT", IEEE Journal of Solid-State Circuits, Vol. 30, No. 3, March 1995, pages 300–305.

The storage elements described in these known architectures include delay lines which are very simple elements to manage, and which have the advantage of generally being compact (use of three transistors per bit stored). However, these elements are not always available as standard cells in stock libraries of components usable for defining and designing integrated circuits. Furthermore, their electrical characteristics are dependent on the technology used so that the architecture of the circuit must be carefully re-examined whenever the technology evolves. Moreover, such architectures use delay lines whose total storage capacity is equal to 2N0 for an initial size of Fourier transform equal to N0, while the theoretical minimum storage capacity is equal to N0.

SUMMARY OF THE INVENTION

An object of the invention is to use a random access memory, such as a single access memory, for storage in each stage of a pipelined architecture.

The use of a random access memory, whether it is dual access (dual port) or single access (single port permitting either write-access or read-access at each cycle of the internal clock of the device), requires specific management of addressing so that the intermediate data in memory can be stored and redelivered in the right order. This management is all the more complex when the radix of the Fourier transform is greater than 2, and in particular, when it is equal to 4. This goes against current teachings on the subject which provide for the use of delay lines or shift registers.

Moreover, it has been found that the use of a random access memory enabled the storage capacity to be reduced stage by stage, and, therefore, the total storage capacity of the device relative to the storage capacity required when employing delay.lines. Such a component is readily available in ordinary libraries of components, particularly when in its simplest form (single access memory), is totally independent of the technology used, and is compatible with very high clock frequencies.

In a pipelined architecture using a single access memory, the latency time, i.e., the duration separating the arrival of the first sample of a symbol and the delivery of the first complex output sample, is around 3N/2 cycles of the basic clock signal regulating the reception of the initial complex samples. This includes N cycles for the filling of the memory of the first stage. The preprocessing includes formulating an auxiliary complex symbol on the basis of each initial complex symbol, and in storing it in a single access memory. This also requires a latency of N cycles of the basic clock signal.

The total duration of latency rises to 5N/2 cycles of the basic clock signal. The latency includes preprocessing followed by transfer of the auxiliary symbol from its storage memory into the memory of the first stage followed by inverse Fourier transform. Such a latency duration may turn out to be incompatible with high speed transmission applications using VDSL modems working at 55 Mbits/second, for example. Stated otherwise, for such high speed applications, the use of a processing of the interleaved type using an architecture of the pipelined type for implementing the inverse Fourier transform calculation, at present proves to be a difficult problem to implement.

The invention provides a solution to this problem, which is to use an inverse Fourier transform implementation with pipelined architecture using a random access memory, such as a single access memory for each processing stage. In particular, the first processing stage uses a random access memory while optimizing the latency so as to obtain, despite the preprocessing phase of the processing of interleaved type, a latency duration equal to that of the inverse Fourier transform calculation means alone, i.e., 3N/2 cycles for an inverse Fourier transform of size N.

The invention therefore proposes a process for transforming a stream of initial complex symbols, respectively formed of N initial complex samples, into a stream of respective groups of 2N real output data by interleaved type processing that includes a preprocessing phase in which for each initial symbol received, an auxiliary symbol formed of N auxiliary complex samples is formulated. A processing phase comprises for each auxiliary symbol an inverse Fourier transform calculation of size N including elementary processing of the butterfly type corresponding to several stages of a general butterfly-like calculation graph, and delivers the 2N real output data corresponding to the initial symbol received.

According to a general characteristic of the invention, the various stages of the graph are implemented within a pipelined architecture, and, upon receiving an initial symbol, two separate random access memories (e.g., single access memories) are simultaneously used to respectively store in a first memory the auxiliary symbol corresponding to this initial symbol, and to perform on the basis of the content of the second memory the elementary processing corresponding to the first stage of the graph. Furthermore, the two memories are swapped with each new receipt of an initial symbol.

Stated otherwise, on receipt of a current initial symbol the corresponding formulated auxiliary symbol is stored in a first memory while the elementary processing corresponding to the first stage of the graph is performed on the basis of the content of a second memory. This second memory contains the formulated auxiliary symbol corresponding to the previous initial symbol. Then, on receipt of the next initial symbol, the corresponding formulated auxiliary symbol is stored in the second memory while the elementary processing corresponding to the first stage of the graph is performed on the basis of the content of the first memory. The elementary processing of the auxiliary symbol corresponds to the current initial symbol. This continues with respect to the receipt of the succeeding symbols.

The simultaneous implementation of the preprocessing and of the elementary processing corresponding to the first stage of the graph in the course of each reception of an initial complex symbol, in combination with the use of two memories used alternately for the preprocessing and for the elementary processing of the Fourier transforms during successive receptions of symbols, makes it possible to dispense with the transferring of the auxiliary samples from one of the memories to the other. The Fourier transform processing begins as soon as one of the memories is full. A saving of a certain number of basic clock cycles is thus achieved.

According to a relatively straightforward mode of implementation, the two memories are single access random access memories of identical structure. The auxiliary complex samples are formulated and stored as a pair in the corresponding memory. Each pair is formulated and stored in the course of a clock cycle of the basic clock signal regulating the reception of the initial complex samples. The identical structure of the memories allows easy swapping of the memories.

When two single access memories are used in combination with the switching of these memories, the total latency time is equal to 3N/2 cycles of the basic clock signal. There are N cycles for the preprocessing and N/2 cycles to obtain the output samples after Fourier transform.

According to one mode of implementation, the auxiliary sample of rank k is formulated on the basis of a pair of paired initial samples which is formed by the initial sample of rank k within the initial symbol and of the initial sample of rank N−k. Two samples are said to be paired when the sum of their respective ranks is equal to N.

Moreover, if r denotes the radix of the inverse elementary Fourier transform associated with the first stage of the graph, each of the two memories is subdivided into r independent memory banks of identical size equal to N/r. There thus are received, with each initial sample, a rank indication representative of its rank within the symbol and a pairing indication indicating whether the initial sample is the first received or the second received of the corresponding pair.

If the pairing indication associated with an initial sample is representative of the first received, this sample is stored in the corresponding memory. If the pairing indication associated with an initial sample is representative of the second received, the initial sample paired with this sample received second is extracted from the corresponding memory. The two paired auxiliary samples of rank k and of rank N−k are formulated on the basis of these two paired initial samples of rank k and of rank N−k. These two paired auxiliary samples are stored in two separate memory banks of the same corresponding memory at the respective storage addresses associated with the two initial samples of rank k and of rank N−k. The elementary Fourier transform processing of the first stage of the graph is performed successively on the N/r groups of auxiliary samples respectively stored at the same address in the r memory banks of the other corresponding memory.

More particularly, when the memory banks are indexed from 0 to r−1 and all are addressable at addresses lying between 0 and N/r−1, and if the pairing indication associated with an initial sample of rank k is representative of the first received, this sample is stored in the memory bank whose index is equal to E[rk/N]. The symbol E denotes the integer part operator at the address k modulo N/r.

However, if the pairing indication associated with an initial sample of rank k is representative of the second received, and the paired initial sample stored in the memory bank of index equal to E[r(N−k)/N] at the address (N−k) modulo N/r is read from the memory, then the auxiliary sample of rank k is formulated and stored in the memory bank of index equal to E[rk/N] at the address k modulo N/r. The auxiliary sample of rank N−k is also formulated and stored in the memory bank of index equal to E[r(N−k)/N] at the address (N−k) modulo N/r.

The subject of the invention is also a device for transforming a stream of initial complex symbols respectively formed of N initial complex samples into a stream of respective groups of 2N real output data. This device comprises transformation means of the interleaved type comprising preprocessing means able to formulate for each initial symbol received an auxiliary symbol formed of N auxiliary complex samples. The device further comprises processing means able to perform for each auxiliary symbol an inverse Fourier transform calculation of size N including elementary processing of the butterfly type corresponding to several stages of a general butterfly-like calculation graph. The 2N real output data corresponding to the initial symbol received is delivered.

According to a general characteristic of the invention, the processing means are of a pipelined architecture and the device comprises two separate random access memories. On receipt of an initial symbol, the preprocessing means are able to store in a first memory the auxiliary symbol corresponding to this initial symbol. Simultaneously, the elementary processing means of the first stage of the processing means with pipelined architecture are able to perform on the basis of the content of the second memory the elementary processing corresponding to the first stage of the graph. The device furthermore comprises control means able to swap access to the two memories by the elementary processing means with each new receipt of an initial symbol.

According to a relatively straightforward embodiment of the invention, the two memories are single access random access memories of identical structure. The preprocessing means are able to formulate and to store a pair of the auxiliary complex samples in the corresponding memory.

According to one embodiment of the invention, the preprocessing means are able to formulate the auxiliary sample of rank k on the basis of a pair of paired initial samples which is formed by the initial sample of rank k within the initial symbol and of the initial sample of rank N−k. If r denotes the radix of the inverse elementary Fourier transform associated with the first stage of the graph, each of the two memories is subdivided into r independent memory banks of identical size equal to N/r. The memory banks are indexed from 0 to r−1 and all are addressable by addresses lying between 0 and N/r−1. With each initial sample received there are associated a rank indication representative of its rank within the symbol and a pairing indication indicating whether the initial sample received is the first received or the second received of the corresponding pair.

If the pairing indication associated with an initial sample of rank k is representative of the first received, the preprocessing means are able to store this sample in the memory bank of index equal to E[rk/N] at the address k modulo N/r. If the pairing indication associated with an initial sample of rank k is representative of the second received, the preprocessing means are able to extract from the memory the paired initial sample stored in the memory bank of index equal to E[r(N−k)/N] at the address (N−k) modulo N/r.

The preprocessing means are thereafter able to formulate the auxiliary sample of rank k and to store it in the memory bank of index equal to E[rk/N] at the address k modulo N/r. The auxiliary sample of rank N−k is formulated and stored in the memory bank of index equal to E[r(N−k)/N] at the address (N−k) modulo N/r.

The elementary processing means successively performs processing of butterfly type on the N/r groups of auxiliary samples respectively stored at the same address in the r memory banks of the corresponding memory.

BRIEF DESCRIPTION OF THE DRAWINGS

Other advantages and characteristics of the invention will become apparent from the description of entirely non-limiting embodiments and modes of implementation, and of the appended drawings in which.

DETAILED DESCRIPTION OF THE PREFERRED EMBODIMENTS

Figure 1:
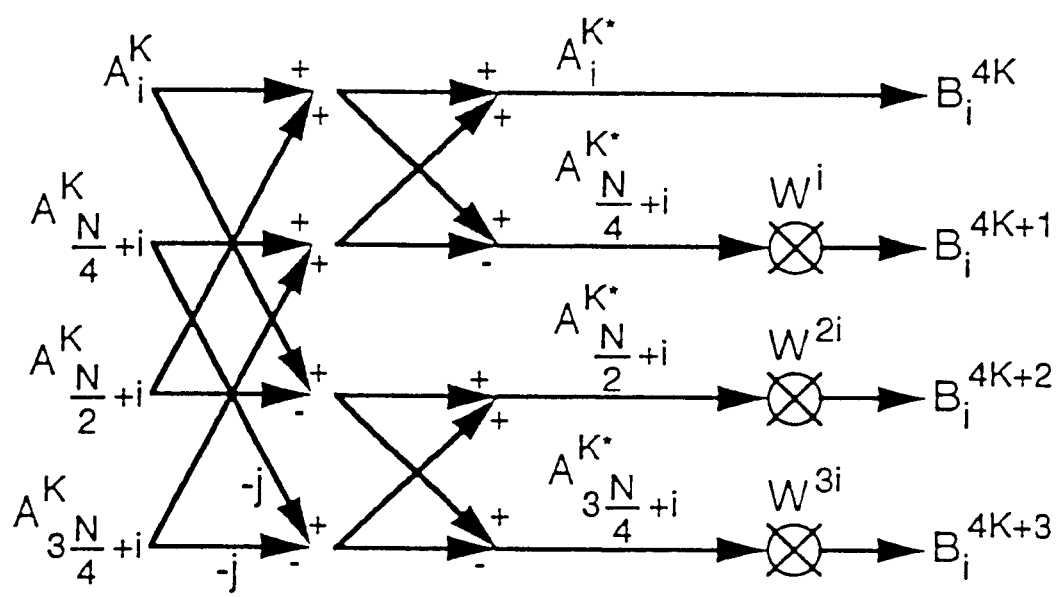
FIG. 1 illustrates a radix 4 butterfly-like inverse Fourier transform operator in accordance with the present invention.

Reference will now be made more particularly to FIG. 1. In general, if the size of the block of samples (or symbols) received at an input for a radix 4 processing stage is equal to N, these block of samples can be divided into four segments of N/4 samples each. The N/4 samples are consecutively temporally received. The first segment is formed of the samples $A_i^K$, the second segment is formed of the samples $A_{N/4+i}^K$, the third segment is formed of the samples $A_{N/2+i}^K$, and the fourth segment is formed of the samples $A_{3N/4+i}^K$. The variable i varies from 0 to N/4−1, and represents the number of processing of the butterfly type performed in the stage on each block of samples received. The variable K represents the $K^{th}$ block received by the stage. The variable i is equal to k modulo 4, where k represents the rank of the data item in the block (or symbol).

If s denotes the rank of the relevant stage, then N is equal to $N0/4^s$, where N0 denotes the initial size of the inverse Fourier transform, i.e., the size of each symbol received by the input stage, as will be radily understood by one skilled in the art.

Furthermore, if the relevant stage is the first, N is equal to N0 and the $K^{th}$ block corresponds to the $K^{th}$ symbol received. If the relevant stage is not the first (rank s different from 0), each symbol input to the device is divided recursively within each stage into $4^s$ blocks K, where K varies from 0 to $4^s-1$.

The result of these butterfly type processing are intermediate samples which are also ordered within four intermediate segments each containing N/4 intermediate samples. More precisely, the first intermediate segment contains the intermediate samples $A_i^{K*}$, the second intermediate segment contains the intermediate samples $A_{N/4+i}^{K*}$, the third intermediate segment contains the samples $A_{N/2+i}^{K*}$, and the fourth intermediate segment contains the samples $A_{3N/4+i}^{K*}$.

These intermediate samples are obtained according to the following formulas (VII) to (X):

$$A_i^{K*} = A_i^K + A_{N/4+i}^K + A_{N/2+i}^K + A_{3N/4+i}^K \quad \text{(VII)}$$

$$A_{N/4+i}^{K*} = A_i^K - A_{N/4-i}^K + A_{N/2+i}^K - A_{3N/4+i}^K \quad \text{(VIII)}$$

$$A_{N/2+i}^{K*} = A_i^K - j A_{N/4+i}^K - A_{N/2+i}^K + j A_{3N/4+i}^K \quad \text{(IX)}$$

$$A_{3N/4+i}^{K*} = A_i^K + j A_{N/4+i}^K - A_{N/2+i}^K - j A_{3N/4-i}^K \quad \text{(X)}$$

In these formulas, j denotes the complex number whose square is equal to −1, and i varies from 0 to N/4−1. These intermediate samples are next multiplied by predetermined coefficients $W^0$ (such as by 1), $W^i$, $W^{2i}$ and $W^{3i}$ according to the relevant segments. These coefficients are conventional complex coefficients given by the formula $W^{pi} = e^{+2j\pi pi/N}$, where p varies from 0 to 3 and i varies from 0 to N/4−1.

After multiplying by these coefficients W, four blocks $BB^{4K}$, $BB^{4K+1}$, $BB^{4K+2}$, $B_i^{4K+3}$ respectively containing N/4 output samples $B_i^{4K}$, $BB^{4K+1}$, $B_i^{4K+2}$ and $B_i^{4K+3}$ are obtained at the output of the processing stage, with i varying from 0 to N/4−1. All the blocks BB will then be processed consecutively by the elementary processing means of the following stage. Each of these blocks is regarded as an input symbol for this following stage.

Figure 2:
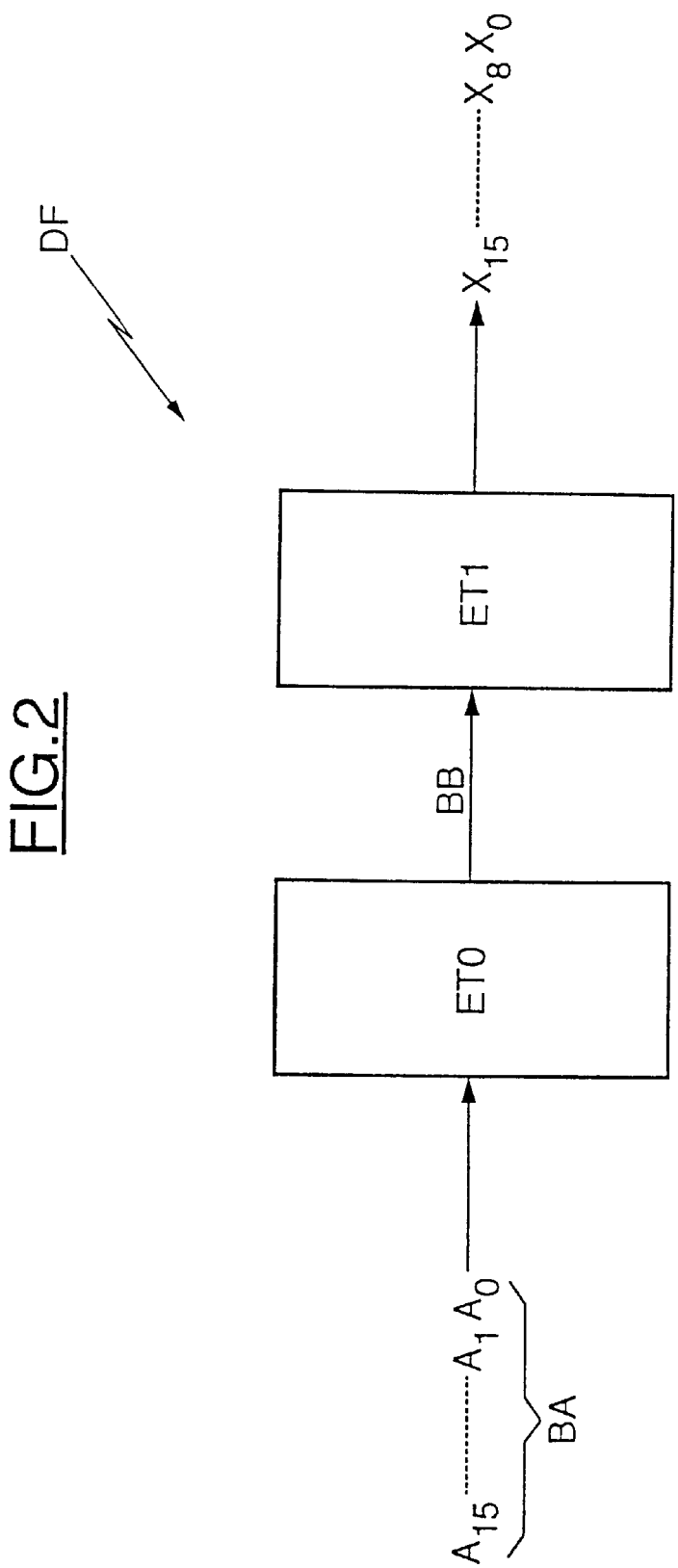
FIG. 2 is a schematic diagram of an inverse Fourier transform implementation with a pipelined architecture including two processing stages in accordance with the present invention.

In FIG. 2, the reference DF denotes a pipelined architecture comprising two radix 4 processing stages, referenced as ET0 and ET1. These two processing stages perform elementary Fourier transform processing in accordance with the operator illustrated in FIG. 1. For purposes of simplifying this figure, it is assumed that the size of the input symbol BA is equal to 16, and the size of the Fourier transform therefore also is equal to 16.

The input stage EP0 receives streams of symbols BA, respectively comprising sixteen samples $A_0$–$A_{15}$. The output of the stage ET0 delivers successive blocks BB of four samples which are processed in the stage ET1. This stage ET1 delivers the output symbol $X_{13} \ldots X_8 X_0$ corresponding to the inverse Fourier transformation of the input symbol BA.

Figure 3:
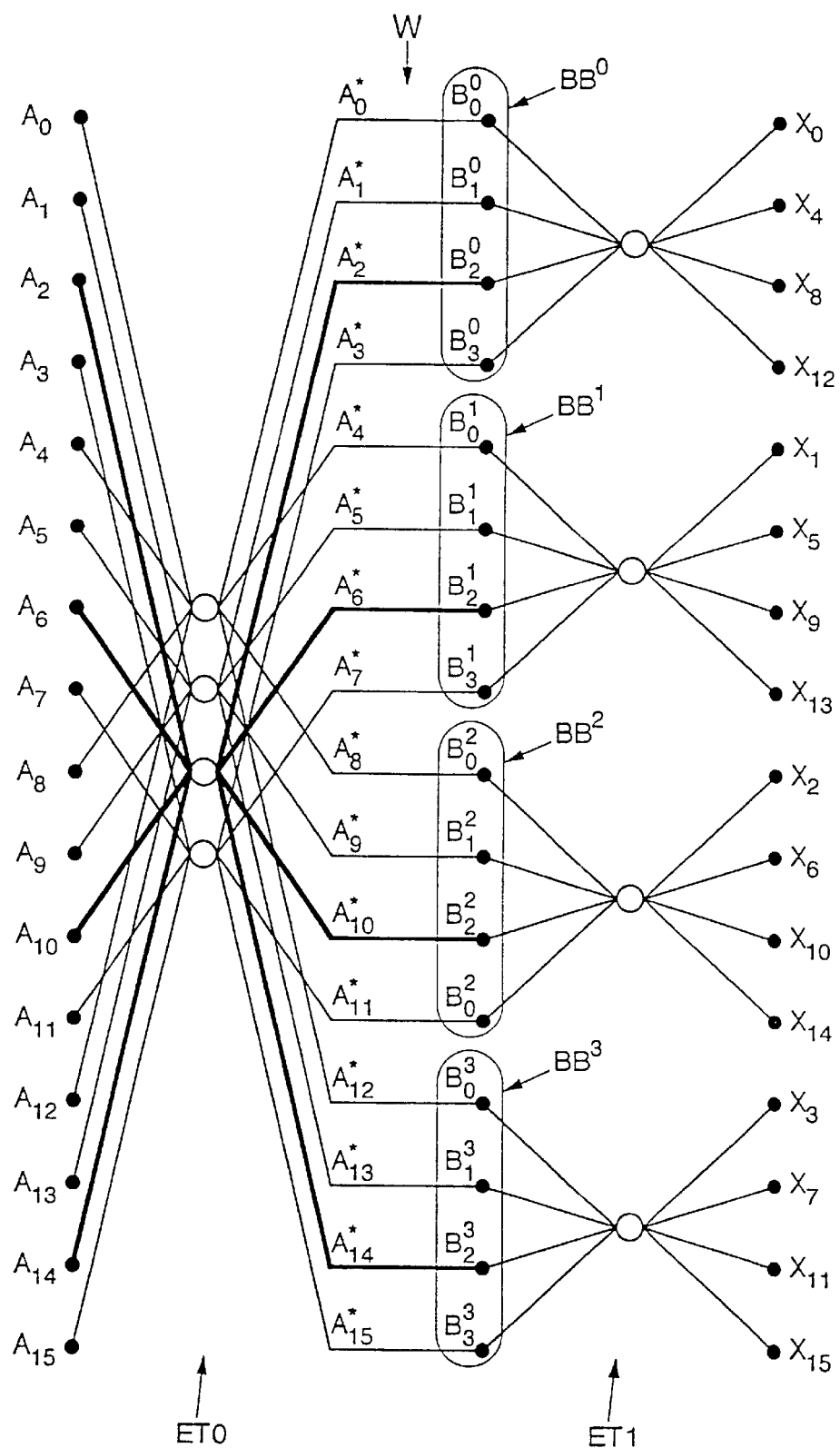
FIG. 3 illustrates butterfly type processing performed in the two processing stages illustrated in FIG. 2.

FIG. 3 illustrates the particular case of the sixteen data (N=16) of each block received by the stage ET0. The radix 4 processing stage then performs N/4 processing of the butterfly type in accordance with the graph of FIG. 1 on N/4 separate groups of four data items, formed respectively by a sample of the first segment and the counterpart samples of the other three segments.

In the particular example the of FIG. 3, the stage ET0 performs a first butterfly type processing on the group formed of the samples $A_0$, $A_4$, $A_8$ and $A_{12}$, a second processing of the butterfly type on a second group formed of the samples $A_1$, $A_5$, $A_9$ and $A_{13}$, and so on up to a fourth butterfly type processing on the fourth group formed of the samples $A_3$, $A_7$, $A_{11}$ and $A_{15}$.

The elementary processing means of step ET1 will successively perform a processing of butterfly type in accordance with the graph of FIG. 1 on the four samples of each input block BB to obtain intermediate data B*. Samples are then output which are in fact, in the present case, the result of the inverse Fourier transform.

Figure 4:
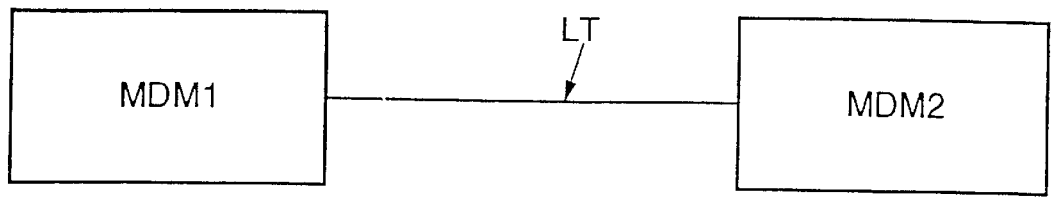
FIG. 4 schematically illustrates implementation of the present invention with two modems connected to a telephone line.

In FIG. 4, the references MDM1 and MDM2 respectively denote two modems talking by way of a telephone line LT. Each modem comprises a sending part and a receiving part. Within the context of the present invention, the sending part of modem MDM1 will be discussed in particular.

Figure 5:
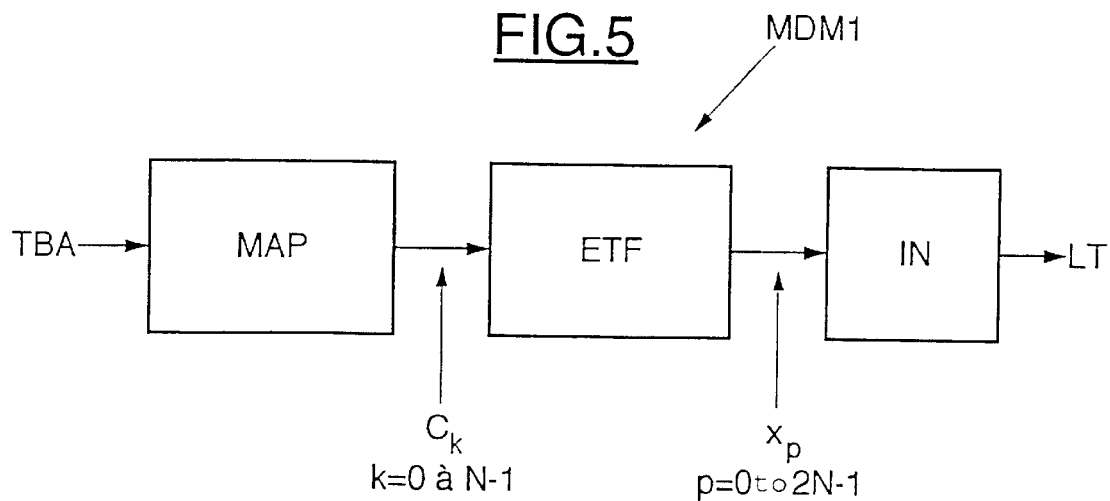
FIG. 5 schematically illustrates in greater detail the architecture of one of the modems illustrated in FIG. 4.

As illustrated more particularly in FIG. 5, the sending part of the modem MDM1 comprises carrier allocation means MAP, of conventional structure known per se, receiving an asynchronous bit train TBA and delivering a regular a sequence of carriers at a predetermined frequency, such as 11 MHz, for example. This clock signal is the basic signal referenced in the subsequent text by the reference SMCK. Each complex carrier also denoted subsequently by "complex initial sample" $C_k$ is associated with a frequency $f_k$ which is a submultiple of the sampling frequency. Typically, the intercarrier frequency bandwidth is on the order of a few kHz. The variable N (e.g., 2048) for the initial complex samples $C_k$, such as defined by formula (III), form an initial complex symbol.

In practice, the various symbols are mutually spaced by a guard interval consisting of a greater or lesser number of samples, which may be a copy of certain samples of the symbol following the guard interval. The sending of the various symbols of the stream of symbols sent by the carrier allocation means MAP are regulated by a symbol clock signal SCK whose frequency is typically on the order of 5 kHz for N=2048.

Each initial complex symbol, formed of the N initial complex samples $C_k$ is thereafter transformed by the transformation means ETF into a group of 2N real output data $x_p$, with p varying from 0 to 2N−1. The output data $x_p$ are thereafter transmitted to an interface IN of conventional structure before transmission on the telephone line LT.

Figure 6:
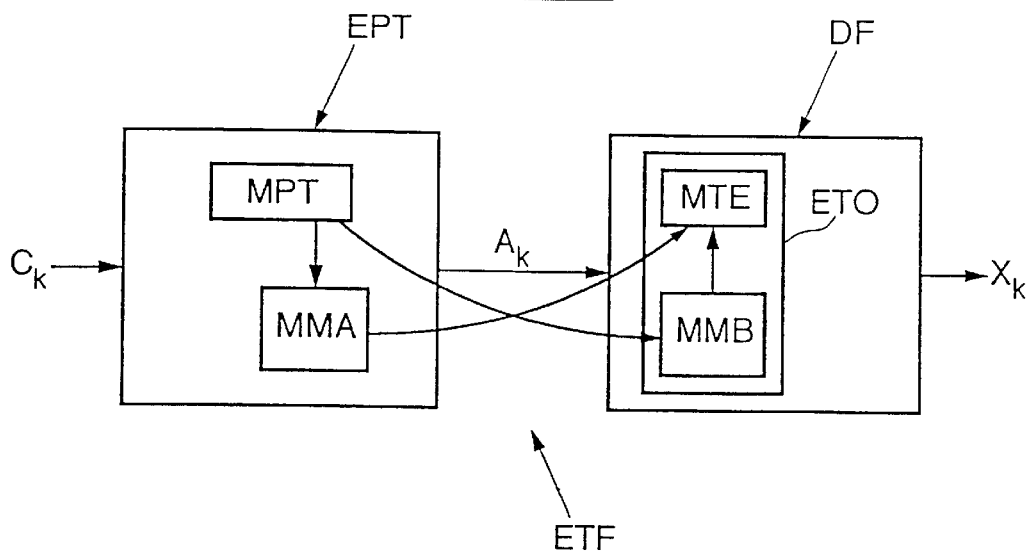
FIG. 6 schematically illustrates in greater detail a portion of the architecture illustrated in FIG. 5.

As schematically represented in FIG. 6, the N initial complex samples $C_k$ of an initial complex symbol undergo in a preprocessing stage EPT a preprocessing phase in the course of which N auxiliary complex samples $A_k$, such as defined by formula (VI) and forming an auxiliary complex symbol, are formulated on the basis of these N initial complex samples. This auxiliary symbol thereafter undergoes in processing means DF having a pipelined architecture of the type illustrated in FIG. 2 an inverse Fourier transform of size N allowing the delivery of N complex output samples $X_k$.

In this respect, as illustrated more particularly in FIG. 2, the output samples $X_k$ leave in a different order from the order of input of the samples $A_k$. In fact, they leave in a so-called "bit reverse" order. More precisely, if one refers to the graph of FIG. 1, the bit reverse order includes delivering successively at the output of each processing stage of the pipelined-architecture system the samples $B_i^{4K}$, $B_i^{4K+2}$, $B_i^{4K+1}$ and $B_i^{4K+3}$. Therefore, in practice, the complex output samples $X_k$ undergo a rearrangement and then the real and imaginary parts of these output samples $X_k$ are extracted therefrom so as to obtain respectively the real data of even ranks $x_{2p}$ and of odd ranks $x_{2p-1}$ in accordance with formulas (IV) and (V).

The preprocessing stage EPT comprises in particular preprocessing means MPT and a random access memory MMA. The stage ET0 of the means DF comprises, in particular, elementary processing means MTE capable of performing the inverse Fourier transform processing of the first stage, and a random access memory MMB.

The samples contained in each of the symbols received are delivered at the frequency of the basic clock signal SMCK. The means MPT are for their part regulated by a working clock signal MCK whose frequency is a multiple of the frequency of the basic signal SMCK. More precisely, this frequency is twice as large as the frequency of the basic signal SMCK. That is, this frequency is four times as large depending on whether the means MPT receive in the course of each cycle of the basic signal SMCK, either the real part and the imaginary part of each sample, or only the real part or the imaginary part. The frequency of the signal MCK also depends on the passband of the memories MMA and MMB. In otherwords, the frequency depends on their capacity to store for each complex sample either the real part and the imaginary part, or only the real part or the imaginary part.

It is now assumed, for purposes of simplifying the present discussion, that the real part and the imaginary part of a complex sample $C_k$ are received in the course of each clock cycle of the signal SMCK, and that the memories MMA and MMB can store this sample. In this case, the frequency of the working clock signal MCK is 22 MHz. Each memory MMA, MMB will be appropriately addressable during the preprocessing phase at least once in a read mode and once in a write mode in the course of each cycle of the signal SMCK. This is done at the frequency of the signal MCK.

If for each complex sample the memories MMA and MMB store only its real part or its imaginary part, then frequency of the working clock signal MCK is 44 MHz.

Each memory MMA, MMB could then be addressed twice in the read mode and twice in the write mode in the course of each cycle of the signal SMCK. This is done at the frequency of the signal MCK.

As illustrated schematically in FIG. 6 and as will now be discussed in greater detail while referring more particularly to FIGS. 7a–7c, the preprocessing phase and the elementary inverse Fourier transform processing of the first stage ET0 of the device with a pipelined architecture use the two separate memories MMA and MMB. These memories will be swapped with each new receipt of an initial complex symbol.

Figure 7A:
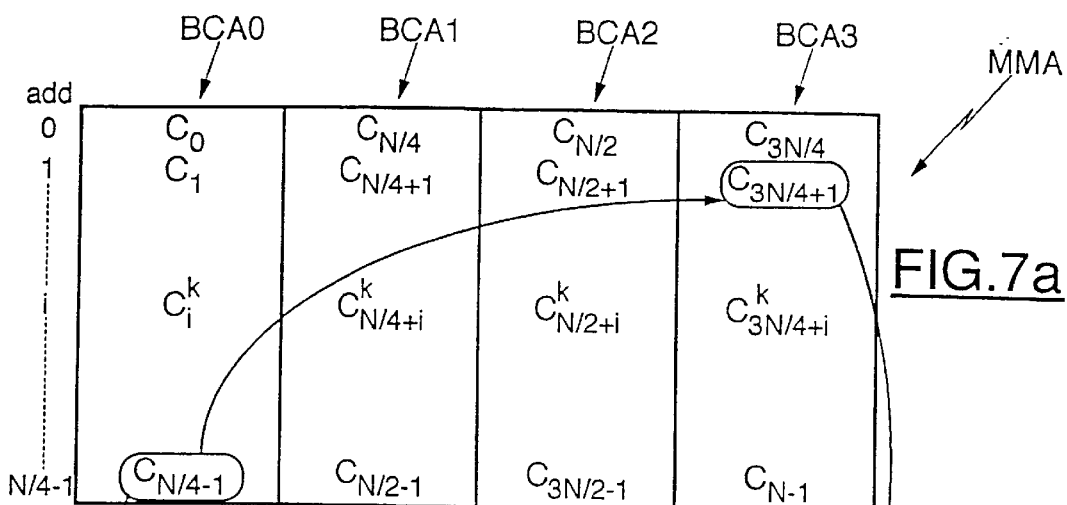
FIGS. 7a–7c schematically illustrate the structure and the use of the two memories which are used alternately in accordance with the present invention by the preprocessing means and the first stage of the processing means performing the inverse Fourier transform calculation.
Figure 7B:
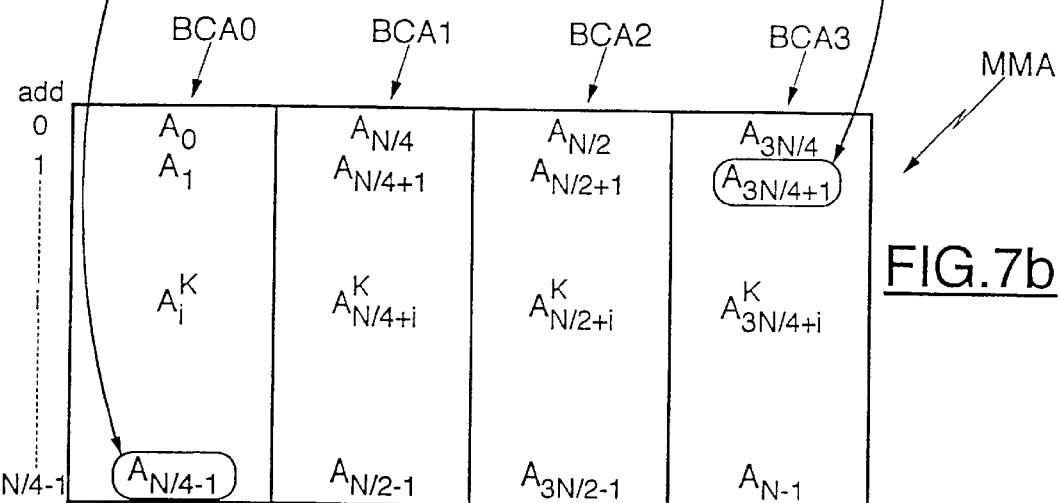
Figure 7C:
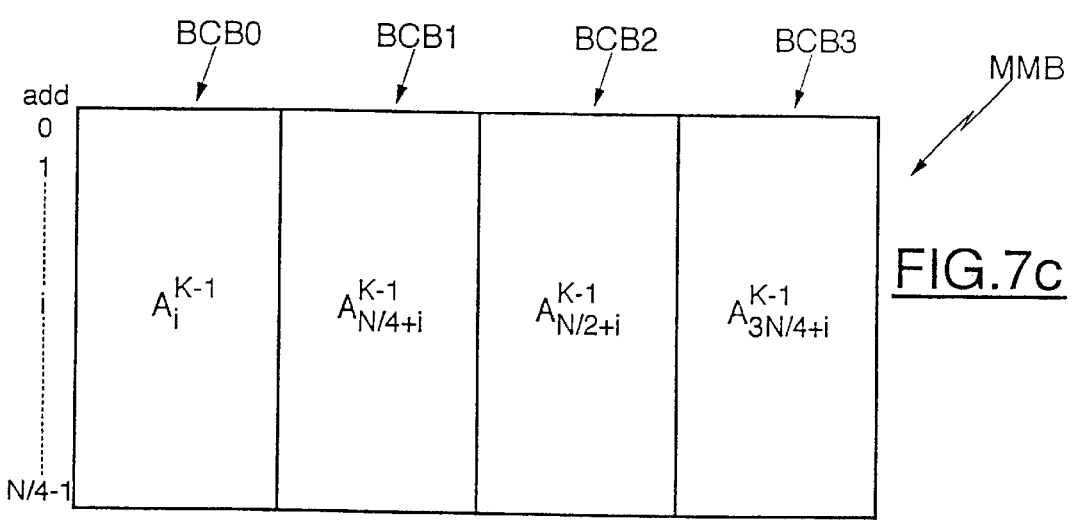

It is now assumed, while referring more particularly to FIGS. 7a–7c, that the stage ET0 is a radix 4 stage. Each of the memories MMA and MMB, which are single access random access memories, comprises four memory banks BCA0–BCA3 for the memory MMA and BCB0–BCB3 for the memory MMB. Each of these memory banks is indexed from 0 to 3, and each memory bank can store N/4 complex samples at the addresses add ranging from 0 to N/4−1.

The carrier allocation means MAP delivers at each cycle of the clock signal SMCK an initial complex sample $C_k$ (k varying from 0 to N−1), and a rank indication indicating the rank k of this initial sample within the initial complex symbol. Also delivered is a pairing indication, e.g., formed of one bit, indicating whether the initial complex sample delivered is the first of the pair formed by this initial complex sample and its paired counterpart, or else whether it is the second delivered. It will be recalled here that two paired samples are the samples of rank k and of rank N−k. This pairing indication is important since the samples $C_k$ are not necessarily delivered in order, as readily understood by one skilled in the art.

By way of example, the pairing bit having the value 0 and associated with the reception of an initial complex sample indicates that this initial complex sample is the first received and that its paired counterpart has not yet been received. However, if the pairing bit associated with an initial complex sample equals 1, this signifies that this initial complex sample is the second received of the pair.

Consequently, its paired counterpart has already been received.

It is now assumed that the preprocessing stage EPT receives the initial complex symbol of rank K and that the preprocessing means uses the memory MMA. If the pairing bit associated with the initial sample of rank k equals 0, this sample $C_k$ is stored in the course of the corresponding cycle of the signal SMCK in the memory bank of the memory MMA having the index equal to E[4k/N]. The variable E denotes the integer part operator, and at the address k modulo N/4.

Thus, as illustrated in FIG. 7a, the sample $C_i$ will be stored in bank 0 at the address 1, whereas the sample $C_{N/2}$ will be stored in memory bank BCA2 at the address 0. The sample $C_{N-1}$ will be stored in memory bank BCA3 at the address N/4−1. More generally, the samples $C_i^K$, $C_{N/4+i}^K$, $C_{N/2+i}^K$, $C_{3N/4+i}^K$, will be stored respectively in memory banks BCA0, BCA1, BCA2, and BCA3 at the address i, with i varying from 0 to N/4−1.

In fact, this is true if the samples received are associated with a pairing bit equal to 0. The storage locations of all the initial complex samples $C_k$ of the symbol of rank K are represented in FIG. 7a., assuming that each of these samples was assigned the pairing bit equal to 0. However, this is not the case in reality.

When an initial complex sample $C_k$ is associated with a pairing bit equal to 1, this initial sample is not stored in the memory MMA. The paired initial sample, which is stored in the memory bank of index equal to E[4(N−k)/N] at the address (N−k) modulo N/4 is read from the memory MMA. The complex auxiliary sample $A_k$ of rank k is then formulated in accordance with formula (VI), and is stored in the memory bank of index equal to E[4k/N] at the address k modulo N/4. The auxiliary sample $A_{N-k}$ of rank N−k is also formulated in accordance with formula (VI) in which k has been replaced by N−k. Also, this auxiliary sample of rank N−k is stored in the memory bank of index equal to E[4(N−k)/N] at the address (N−k) modulo N/4.

This extraction of the paired sample, the formulating of the two auxiliary samples, then their storage in the memory MMA are performed in the course of the clock cycle of the signal SMCK by successive read and write accesses of the memory MMA.

By way of example, it is assumed, as illustrated by the arrows in FIGS. 7a and 7b, that the initial complex sample $C_{3N/4+1}$ is associated with a pairing bit equal to 1. Its paired complex sample is therefore the sample $C_{N/4-1}$. This paired sample is therefore extracted at the address N/4−1 and the two paired initial complex samples $C_{N/4-1}$ and $C_{3N/4+1}$ are used to formulate the auxiliary complex sample $A_{N/4-1}$ of rank N/4−1. This sample is stored in the memory bank of index 0 at the address N/4−1. The paired auxiliary sample $A_{3N/4+1}$ of rank 3N/4+1 is also formulated and stored in the memory bank BCA3 of index 3 of the memory MMA at the address 1.

Thus, on completing N clock cycles of the clock signal SMCK regulating the reception of the initial complex samples, the memory MMA is completely filled by the auxiliary complex samples $A_k^K$ forming the auxiliary symbol of rank K associated with the initial symbol of rank K. More precisely, as illustrated in FIG. 7b, the four auxiliary complex samples $A_i^K$, $A_{N/4+i}^K$, $A_{N/2+i}^K$ and $A_{3N/4+1}^K$ are then all stored at the address i (i varies from 0 to N/4−1). This is done in the four memory banks of the memory MMA.

In parallel with this storing of the auxiliary complex samples of rank K, the elementary processing means MTE of stage ET0 performed an elementary inverse Fourier transform processing of the butterfly type on the basis of the content of the memory MMB. The memory MMB in fact contained the auxiliary symbol of rank K−1.

On receipt of the next initial complex symbol of rank K+1, that is to say during the next cycle of the symbol clock signal SCK, the elementary processing means MTE of stage ET0 will use the content of the memory MMA which contains the auxiliary symbol of rank K (FIG. 7b). More precisely, this elementary Fourier transform processing of the first stage of the graph is performed successively on the N/4 groups of auxiliary samples respectively stored at the same address i in the four memory banks of the memory MMA in accordance with formulas (VII) to (X).

To perform this elementary processing, a relatively straightforward mode of realization includes read-accessing the memory MMA once in the course of each cycle of the signal SMCK to extract the four auxiliary samples stored at the address i. This is done to calculate successively one by one the samples $A_k^*$, with k varying from 0 to N−1, and then the output samples B.

Another possibility includes, in the course of each cycle of the signal SMCK, of read-accessing the memory MMA a first time to calculate the four samples $A_i^*$, $A_{N/4+i}^*$, $A_{N/2+i}^*$, and $A_{3N/4+i}^*$. The sample $A^*_i$ is then delivered to the next stage after multiplication by the appropriate coefficient, while the samples $A_{N/4+i}^*$, $A_{N/2+i}^*$, and $A_{3N/4+i}^*$ are rewritten to the memory while awaiting delivery to the next stage.

In this mode of realization, the elementary processing means are clocked by the signal MCK. It should be noted that in the succeeding stages of the pipelined architecture, the corresponding elementary processing means are also preferably in accordance with this mode of realization. The only difference is that the samples delivered A* are replaced when they arise in the memory of the corresponding stage by the corresponding samples A of the next symbol.

Moreover, in the course of this next clock cycle of the signal SCK, the preprocessing means, which receive the initial symbol of rank K+1, will formulate and store the auxiliary symbol of rank K+1 in the memory MMB in accordance with what was described above for the memory MMA. Also, in the next symbol clock cycle, the elementary processing means MTE of the stage ET0 will again use the content of the memory MMB, while the preprocessing means which will receive the initial complex symbol of rank K+2 will again use the memory MMA for the storage of the auxiliary complex symbol of rank K+2, and so on.

With regards to the hardware embodiment of the various operators in the form of integrated circuits or in the form of reprogrammable logic circuits (FPGA), whether these be the preprocessing or Fourier transform operators, the latter may be easily embodied in a relatively straightforward manner. For example, this may be done by automatic synthesis on the basis of the formulas presented above and of the functional description of implementation also.presented above. In this respect, these operators and the elementary Fourier transform processing means comprise in particular multipliers and adders as well as read-only memories containing the sine and cosine values of the complex coefficients $e^{j\pi k/N}$ (formula VI) and $W^{pi}$.

The control means making it possible to swap the two memories may be embodied through controlled multiplexers alternately linking the preprocessing means MPT and MTE to the two memories. With regards to the formulating of the addresses and of the indexes of the memory banks, these means may easily be embodied in a relatively straightforward manner by one skilled in the art on the basis of multipliers and subtracters. Finally, what has been described above for a radix 4 is applied easily to a radix 2 using memories MMA and MMB with two memory banks each.

That which is claimed is:

1. A method for transforming a stream of initial complex symbols respectively formed of N initial complex samples into a stream of respective groups of 2N real output data using interleaved type processing comprising:

forming an auxiliary symbol that includes N auxiliary complex samples using a preprocessing phase for each initial complex symbol received;

calculating an inverse Fourier transform having size N for each auxiliary symbol using a processing phase comprising elementary processing of the butterfly type corresponding to a plurality of stages of a general butterfly-like calculation graph;

upon receiving each initial symbol, two single-access random access memories of identical structure are simultaneously used for respectively storing in a first random access memory the auxiliary symbol corresponding to the received initial symbol, and for performing on the basis of the contents of the second random access memory the elementary processing corresponding to a first stage of the graph;

swapping functions of the two random access memories with each new receipt of an initial symbol;

delivering the 2N real output data corresponding to the initial symbol received; and said forming comprising forming and storing a pair of auxiliary complex samples in said two random access memories, each pair being formulated and stored during a cycle of a clock signal regulating reception of the initial complex samples.

2. A method according to claim 1, wherein the plurality of stages of the graph are implemented within a pipelined architecture.

3. A method according to claim 1, wherein an auxiliary sample of rank k is formulated on the basis of a pair of paired initial samples formed by an initial sample of rank k within the initial symbol and of an initial sample of rank N−k, with r denoting the radix of the inverse elementary Fourier transform associated with the first stage of the graph, and wherein each of the two random access memories is subdivided into r independent memory banks of identical size equal to N/r.

4. A method according to claim 3, further comprising receiving with each initial sample a ranking indication representative of its rank within the symbol and a pairing indication indicating whether the initial sample received is a first received or a second received of the corresponding pair, and if the pairing indication associated with the initial sample is representative of the first received, this sample is stored in the corresponding random access memory, and if the pairing indication associated with the initial sample is representative of the second received, the initial sample paired with this sample received second is read from the corresponding random access memory.

5. A method according to claim 4, wherein the two paired auxiliary samples of rank k and of rank N−k are formulated with respect to the two paired initial samples of rank k and of rank N−k, and the former samples are stored in two memory banks of the same corresponding random access memory at the respective storage addresses associated with the two initial samples of rank k and of rank N−k.

6. A method according to claim 5, wherein the elementary Fourier transform processing of the first stage of the graph is performed successively on the N/r groups of auxiliary samples respectively stored at the same address in the r memory banks of the other corresponding random access memory.

7. A method according to claim 6, wherein the memory banks are indexed from 0 to r−1 and all are addressable by addresses between 0 and N/r−1, and if the pairing indication associated with the initial sample of rank k is representative of the first received, this sample is stored in the memory bank of an index equal to E[rk/N], where E denotes the integer part operator at the address k modulo N/r.

8. A method according to claim 7, wherein if the pairing indication associated with the initial sample of rank k is representative of the second received, the paired initial sample stored in the memory bank of an index equal to E[r(N−k)/N] at the address (N−k) modulo N/r is read from the random access memory, and the auxiliary sample of rank k is formulated and stored in the memory bank of the index equal to E[rk/N] at the address k modulo N/r, and the auxiliary sample of rank N−k is formulated and stored in the memory bank of the index equal to E[r(N−k)/N] at the address (N−k) modulo N/r.

9. A method for transforming a stream of initial complex symbols respectively formed of N initial complex samples into a stream of respective groups of 2N real output data using interleaved type processing comprising:

forming an auxiliary symbol that includes N auxiliary complex samples for each initial complex symbol received;

calculating an inverse Fourier transform having size N for each auxiliary symbol;

upon receiving each initial symbol, two single-access random access memories of identical structure are simultaneously used for respectively storing in a first random access memory the auxiliary symbol corresponding to the received initial symbol, and for performing on the basis of the contents of the second random access memory the inverse Fourier transform;

swapping functions of the two random access memories with each new receipt of an initial symbol;

delivering the 2N real output data corresponding to the initial symbol received; and said forming comprising forming and storing a pair of auxiliary complex samples in said two random access memories, each pair being formulated and stored during a cycle of a clock signal regulating reception of the initial complex samples.

10. A method according to claim 9, wherein forming is performed using a preprocessing phase; wherein calculating is performed using a processing phase comprising elementary processing of the butterfly type corresponding to a plurality of stages of a general butterfly-like calculation graph; and wherein the inverse Fourier transform is performed by the elementary processing corresponding to a first stage of the graph.

11. A method according to claim 10, wherein the plurality of stages of the graph are implemented within a pipelined architecture.

12. A method according to claim 9, wherein an auxiliary sample of rank k is formulated on the basis of a pair of paired initial samples formed by an initial sample of rank k within the initial symbol and of an initial sample of rank N−k, with r denoting the radix of the inverse elementary Fourier transform associated with the first stage of the graph, and wherein each of the two random access memories is subdivided into r independent memory banks of identical size equal to N/r.

13. A method according to claim 12, further comprising receiving with each initial sample a ranking indication representative of its rank within the symbol and a pairing indication indicating whether the initial sample received is a first received or a second received of the corresponding pair, and if the pairing indication associated with the initial sample is representative of the first received, this sample is stored in the corresponding random access memory, and if the pairing indication associated with the initial sample is representative of the second received, the initial sample paired with this sample received second is read from the corresponding random access memory.

14. A method according to claim 13, wherein the two paired auxiliary samples of rank k and of rank N−k are formulated with respect to the two paired initial samples of rank k and of rank N−k, and the former samples are stored in two memory banks of the same corresponding random access memory at the respective storage addresses associated with the two initial samples of rank k and of rank N−k.

15. A method according to claim 14, wherein the elementary Fourier transform processing of the first stage of the graph is performed successively on the N/r groups of auxiliary samples respectively stored at the same address in the r memory banks of the other corresponding random access memory.

16. A method according to claim 15, wherein the memory banks are indexed from 0 to r−1 and all are addressable by addresses between 0 and N/r−1, and if the pairing indication associated with the initial sample of rank k is representative of the first received, this sample is stored in the memory bank of an index equal to E[rk/N], where E denotes the integer part operator at the address k modulo N/r.

17. A method according to claim 16, wherein if the pairing indication associated with the initial sample of rank k is representative of the second received, the paired initial sample stored in the memory bank of an index equal to E[r(N−k)/N] at the address (N−k) modulo N/r is read from the random access memory, and the auxiliary sample of rank k is formulated and stored in the memory bank of the index equal to E[rk/N] at the address k modulo N/r, and the auxiliary sample of rank N−k is formulated and stored in the memory bank of the index equal to E[r(N−k)/N] at the address (N−k) modulo N/r.

18. A device for transforming a stream of N initial complex symbols respectively formed of N initial complex samples into a stream of respective groups of 2N real output data comprising:

two random access memories, each random access memories being subdivided into r memory banks of identical size equal to N/r, and the memory banks are indexed from 0 to r−1 and all are addressable by addresses between 0 and N/r−1;

a transformation circuit of the interleaved type comprising a preprocessor for formulating for each initial symbol received an auxiliary symbol formed of N auxiliary complex samples, and a processor for performing for each auxiliary symbol an inverse Fourier transform calculation of size N, and comprising elementary processing of the butterfly type corresponding to several stages of a general butterfly-like calculation; graph, the preprocessor stores in a first random access memory the auxiliary symbol corresponding to receipt of an initial symbol and, simultaneously, the elementary processing corresponding to a first stage of the graph is performed based on the contents of a second random access memory, said preprocessor formulating the auxiliary sample of rank k on the basis of a pair of paired initial samples which is formed by the initial sample of rank k within the initial symbol and of the initial sample of rank N−k, with r denoting the radix of the inverse elementary Fourier transform associated with the first stage of the graph, each initial sample received there are associated a ranking indication representative of its rank within the symbol and a pairing indication indicating whether the initial sample received is the first received or the second received of the corresponding pair, and if the pairing indication associated with the initial sample of rank k is representative of the first received, the preprocessor is able to store this sample in the memory bank of an index equal to E[rk/N], where E denotes the integer part operator at the address k modulo N/r; and a controller for swapping access to the two random access memories by the preprocessor and the elementary processing with each new receipt of an initial symbol.

19. A device according to claim 18, further comprising an output for delivering the 2N real output data corresponding to the initial symbol received; and wherein the processor comprises a pipelined architecture.

20. A device according to claim 18, wherein the two random access memories are single-access random access memories of identical structure, and that the preprocessor is able to formulate and store a pair of the auxiliary complex samples in the corresponding random access memory.

21. A device according to claim 18, wherein if the pairing indication associated with the initial sample of rank k is representative of the second received, the preprocessor is able to read from the random access memory the paired initial sample stored in the memory bank of an index equal to $E[r(N-k)/N]$ at the address $(N-k)$ modulo $N/r$, then to formulate the auxiliary sample of rank k and to store it in the memory bank of the index equal to $E[rk/N]$ at the address k modulo $N/r$, and to formulate the auxiliary sample of rank $N-k$ and to store it in the memory bank of an index equal to $E[r(N-k)/N]$ at the address $(N-k)$ modulo $N/r$, 22. A device according to claim 21, wherein the elementary processing successively performs butterfly type processing on the $N/r$ groups of auxiliary samples respectively stored at the same address in the r memory banks of the corresponding random access memory.

* * * * *

UNITED STATES PATENT AND TRADEMARK OFFICE
CERTIFICATE OF CORRECTION

PATENT NO. : 6,751,642 B2
DATED : June 15, 2004
INVENTOR(S) : Joël Cambonie et al.

It is certified that error appears in the above-identified patent and that said Letters Patent is hereby corrected as shown below:

Column 4,
Line 40, delete "delay.lines" insert -- delay lines --

Column 8,
Line 35, delete "radily" insert -- readily --

Column 9,
Line 21, delete "$X_{13}$..." insert -- $X_{15}$... --
Line 31, delete "example the of" insert -- example of --

Column 10,
Line 32, delete "$X_{2p-1}$" insert -- $X_{2p+1}$ --

Column 13,
Line 26, delete "also.presented" insert -- also presented --

Column 18,
Line 3, delete "N/r," insert -- N/r. --

Signed and Sealed this

Nineteenth Day of April, 2005

JON W. DUDAS
*Director of the United States Patent and Trademark Office*